United States Patent [19]
Nicholson

[11] 3,940,463
[45] Feb. 24, 1976

RELATING TO THE REPAIR OF TIRES

[76] Inventor: Alfred William Nicholson, 63 Addington Road, West Wickham, Kent, England

[22] Filed: Aug. 1, 1974

[21] Appl. No.: 494,353

[30] Foreign Application Priority Data
Aug. 1, 1973 United Kingdom............... 36601/73

[52] U.S. Cl..................... 264/36; 24/74 R; 24/171; 24/196; 264/40; 264/314; 425/12; 425/14; 425/27
[51] Int. Cl.²............................................ B29H 5/16
[58] Field of Search ............. 264/36, 315, 314, 326; 425/11, 14, 15, 16, 26, 27, 12; 156/95, 97, 115, 394 FM; 24/74 R, 171, 196

[56] References Cited
UNITED STATES PATENTS
3,541,644  11/1970  Lejeune................................ 425/27

*Primary Examiner*—Jan H. Silbaugh
*Attorney, Agent, or Firm*—Watson, Cole, Grindle & Watson.

[57] ABSTRACT

Apparatus for curing a tire repair wherein an electrical heater pad is placed against the repair area on the inside of the tire, and is supported by a flat air bag which lies against the inside of the tire, and is supported by a sausage-shaped air bag. Another electrical heater pad is placed against the repair area on the outside of the tire, and is held against the tire by another flat air bag which is held against the tire by straps passing around the tire cross-section. A buckle is shown which allows the straps to be pulled up as tight as possible by hand; the bags are then inflated to hold the heater pads firmly against the tire. The repair is then cured by passing currents through the heater pads.

6 Claims, 2 Drawing Figures

RELATING TO THE REPAIR OF TIRES

This invention relates to a method and apparatus for the repair of tires. The invention is particularly applicable to the repair of large tires for trucks, tractors, graders, earth moving machinery and the like having radial plies, but may be applied to tires of other sizes and to tires with cross plies. Although the invention is particularly applicable to the repair of tires which have been damaged in use, it may also be applied to the rectification of faults occurring in the manufacture of tires.

In previously-known methods of repairing tires, a repair patch is placed in the damaged area, and is then cured by means of two electrical heater pads. The tire must be properly supported during the curing process; one method by which this has been achieved has been to position a rigid core inside the tire to support one of the heater pads against the inside of the tire, and to position an inflatable bag against the outside of the tire to support the other heater pad against the outside of the tire. The bag is contained within a large, rigid framework (known as a cavity mold) which extends around about one-third of the circumference of the tire, and supports the inflatable bag on the side away from the tire so that the bag can be pressurized to press the outer heater pad against the tire, and the tire against the core and the inner heater pad. This method produces satisfactory results, but the cavity mold is a heavy, expensive piece of equipment; for example, a cavity mold for a tire for an earth-moving machine may weigh as much as six tons.

In the previously-known method, the rigid core has been made of solid wood or aluminium. The resulting core is too large and heavy for convenient handling, especially in the larger sizes of tire; for example, the core for a tire for an earth-moving machine may be four feet long and two and a half feet in diameter. Furthermore, the core is suitable for use with only one size of tire.

It is an object of the invention to provide apparatus for curing a tire repair which does not involve the use of a cavity mold.

It is another object of the invention to provide apparatus for curing a tire repair which does not involve the use of a rigid core.

It is another object of the invention to enable a tire repair to be cured using apparatus which is light in weight and convenient to handle.

It is another object of the invention to enable different sizes of tire to be repaired without the need for a wide range of cores and cavity molds.

It is another object of the invention to provide a buckle which is quick and convenient to use for connecting straps.

A technique of curing a tire repair according to the present invention includes the steps of applying an inner heater pad to the inside of the tire in the area of the repair, positioning a core within the tire to support the inner heater pad against the inside of the tire, and applying an outer heater pad to the outside of the tire in the area of the repair. A flexible harness is positioned to extend through the center of the tire and around the outside of the tire in the area of the repair, with an inflatable bag between the harness and the outer heater pad. The bag is pressurized and the tire is heated in the area of repair by the heater pads to cure the repair. The flexible harness can be comparatively light in weight, and can be made adjustable so that it can be used for almost any size of tire.

The core may include an inflatable bag which is pressurized after being positioned within the tire. Preferably this inflatable bag is generally flat, and is positioned against the inner surface of the tire, and is supported by a further inflatable bag which is elongate and of generally circular cross-section, and is positioned within the generally flat bag after the latter has been positioned within the tire, and is pressurized before the generally flat bag is pressurized. Thus the heavy, rigid core of the previously-known method is replaced by two inflatable bags, which are much easier to handle, and much less bulky to store. Moreover, at least the generally flat bag can be used for a range of sizes of tires, so that the number of bags needed can be less than the number of sizes of tires to be dealt with.

The purpose of the bag of circular cross-section is to provide, when fully inflated, a shape which approximates to the internal shape of the tire, but in many cases it will not itself be able to apply an even pressure over the whole of the relevant part of the internal surface. The purpose of the generally flat bag is to distribute the pressure of the circular bag evenly over the internal surface of the tire.

The flexible harness may comprise at least one strap and a buckle by which the strap is secured around the tire. Preferably the harness includes a plurality of straps which are positioned around the tire with their center lines approximately radial to the tire and their edges overlapping where they pass through the center of the tire. This allows the pressure exerted by the harness to be more evenly distributed around that part of the circumference of the tire which is covered by the harness than if only a single strap were used.

The strap or straps may be connected to the buckle by being doubled to form a loop which is inserted through an opening in the buckle, an through which a loose pin, longer than the width of the strap, is inserted. This form of buckle allows the length of the harness around the tire to be continuously adjusted, and is convenient to use because it does not require the whole length of the free end of the strap to be pulled through the buckle.

The invention may be carried into practice in various ways but one particular form of apparatus and its method of use will now be described by way of example with reference to the accompanying diagrammatic drawings in which.

Figure 1:
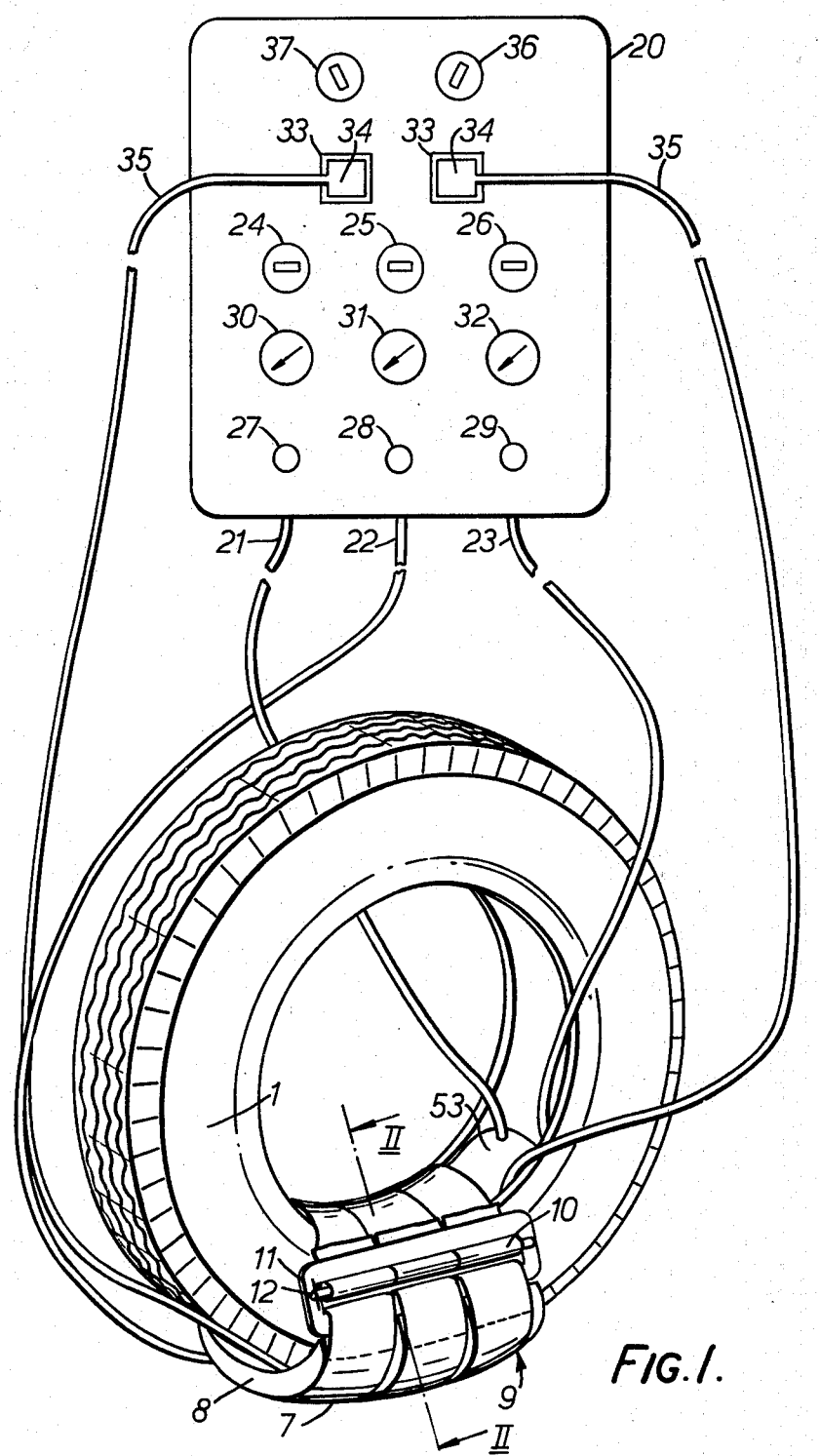
FIG. 1 is a perspective view of a tire and the repair apparatus.
Figure 2:
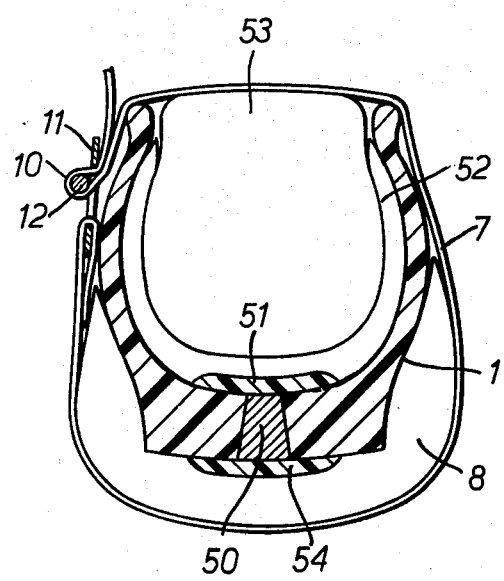
FIG. 2 is a section on the plane II—II in FIG. 1.

A tire 1 whose tread wall has received damage has the necessary repair patch 50 placed in the damaged area and the patch is covered on the inside with a flexible electric heater pad 51 which is covered by a rather flat air bag 52 which lies against the inner surface of the tire and extends from near one bead of the tire to near the other. The bag 52 extends around about 90° of the circumference of the tire. A spacer air bag 53 is then positioned within the U formed by the flat air bag 52. The spacer bag is roughly cylindrical in cross-section, and of a sufficient length to extend around about 120° of the circumference of the tire. A heater pad 54 is then placed on the outside of the tire in the region of the patch 50; this pad is then covered by an inflatable bag 8 and a harness 9 is passed around the outside of the bag 8 and through the opening in the middle of the tire.

The harness 9 consists of three straps 7 of nylon webbing, and a buckle 11 to which one end of each of the straps 7 is permanently connected. The straps lie side by side at their connection to the buckle, but the center line of each of the straps lies approximately radial to the tire when the harness is in use, so that the straps will overlap somewhat as they pass through the opening in the center of the tire. The buckle 11 is flat, and has an oblong opening which is long enough to accommodate the three straps 7 side by side. The free ends of the straps are secured to the buckle by being doubled to form loops, as shown at 10; the loops are then passed through the opening of the buckle, side by side, from the side of the buckle near the tire, and a pin 12 is inserted through all three loops. The ends of the pin 12, outside the loops, rest against the surface of the buckle 11 facing away from the tire; the pin is free to move relative to the buckle, so that when tension is applied to the straps 7, the pin can move until the parts of the straps lying next to the tire are turned through a sufficiently sharp angle where they enter the opening in the buckle that the parts of the straps lying next to the buckle are prevented by friction from slipping.

The apparatus includes a control panel 20. Three air lines 21, 22, 23 lead from pressure regulators 24, 25, 26 respectively which are mounted on the panel. The regulators 24, 25, 26 are pre-set and are supplied with compressed air through a common non-return valve and three on/off valves 27, 28, 29, one for each regulator. The pressure in the lines 21, 22, 23 is indicated by gauges 30, 31, 32 respectively. The air line 21 leads to the spacer air bag 53, the air line 22 leads to the air bag 8 and the air line 23 leads to the air bag 52. The panel has two electrical sockets 33 to receive plugs 34 connected by leads 35 one to the outer heater pad 54 and one to the inner heater pad 51. A temperature-sensing thermocouple is fitted in a pocket on the back of each pad, and the lead 35, plug 34 and socket 33 associated with each pad form electrically independent connections between, on the one hand, the thermocouple and the heating element of the pad, and, on the other hand, a thermostat mounted on the control panel 20. The thermostats associated with the two pads 51, 54 are controlled by a single knob 37, but act independently to control the current passing through the associated heater pad to maintain the temperature at the pad at the value set by the knob 37. The time for which the set temperature is maintained can be controlled by a timer 36.

When the tire has been prepared in the manner described above, the plugs 34 are inserted in the sockets 33. The valve 28 is turned on to admit air to the air line 22 to raise the pressure in the spacer air bag 53 to the level pre-set by the regulator 25 which may, for example, be between thirty and sixty pounds per square inch. Forty pounds per square inch might be used in a typical case. The valve 29 is then turned on to admit air to the air line 23 to inflate the flat air bag 52 to the pressure set by the regulator 26 which may in many cases be equal to the pressure supplied to the spacer air bag 53. The valve 27 is then turned on to admit air to the air line 21 to inflate the bag 8 to the pressure set by the regulator 24, which should be lower than those set by the regulators 25, 26 and may, for example, be half of that set by the regulator 26. Thus the heater pads 51, 54 are firmly pressed against the inner and outer surfaces of the tire in the region to be repaired. The timer 36 is then turned to the time for which heating is required. The heater pads then heat up to the temperature set by the knob 37 and remain heated for the time required to cure the patch 50 and are then switched off automatically. The air from the bag 8 can then be exhausted by turning off the valve 27; and the harness 9 and the outer heating pad 54 are then removed. The tire is allowed to cool to below 180°F, about one hour or so; the valve 29 is then turned off to deflate the flat air bag 52 and the valve 28 is turned off to deflate the spacer air bag 53. The spacer air bag 53, the flat air bag 52 and the inner heating pad 51 are then removed from the tire. The repair is then trimmed.

What I claim as my invention and desire to secure by Letters Patent is:

1. Apparatus for use in curing a tire repair, comprising an inner heater pad to be applied to the inside of the tire in the area of the repair, a core to be positioned within said tire to support said inner heater pad against the inside of said tire, an outer heater pad to be applied to the outside of said tire in the area of said repair, a flexible harness to be positioned to extend through the center of said tire and around the outside of said tire in the area of said repair, said flexible harness including a plurality of straps to be positioned around said tire with the center-line of each said strap approximately radial and a buckle including an opening to admit a loop of each strap, said loops being side by side, and a pin to be inserted through said loops, the length of said pin being greater than the combined width of said straps, an inflatable bag to be positioned between said harness and said outer heater pad, means for pressurizing said inflatable bag, and means for heating said inner and outer heater pads to cure said repair.

2. Apparatus as claimed in claim 1 wherein said core includes an inflatable bag, and wherein means are provided for pressurizing said inflatable bag included in said core.

3. Apparatus as claimed in claim 2 wherein said inflatable bag included in said core is a generally flat bag to be positioned against the inner surface of said tire, and wherein said core includes a further inflatable bag which is elongate and of generally circular cross-section to be positioned within and support said generally flat bag, and wherein means are provided for pressurizing said further inflatable bag.

4. Apparatus as claimed in claim 3 wherein said core extends around only part of the circumference of said tire.

5. A method for curing a tire repair comprising the steps of:
applying an inner heating pad to the inside of the tire in the area of the repair;
positioning a core within the tire for supporting said inner heater pad against the inside of the tire;
applying an outer heater pad to the outside of the tire in the area of the repair;
positioning a harness including a plurality of straps around the tire with the center line of each strap approximately radial;
passing a loop of each of said straps through an opening in a buckle whereby said loops are side by side;
inserting a pin through said loops, the length of said pin being greater than the combined width of the straps;
positioning an inflatable bag between the harness and the outer heater pad;
pressurizing the inflatable bag; and heating the inner and outer heater pads to cure the repair.

6. A method as in claim 5 further comprising the step of positioning another inflatable bag as part of said core within said tire for supporting the same and said step of pressurizing includes the step of pressurizing said additional inflatable bag.

* * * * *

UNITED STATES PATENT OFFICE
CERTIFICATE OF CORRECTION

PATENT NO. : 3,940,463
DATED : February 24, 1976
INVENTOR(S) : Alfred William Nicholson It is certified that error appears in the above-identified patent and that said Letters Patent are hereby corrected as shown below:

[30] FOREIGN APPLICATION PRIORITY DATA

Dec. 20, 1973 United Kingdom............59187/73

Signed and Sealed this

Fourteenth Day of September 1976

[SEAL]

Attest:

RUTH C. MASON
*Attesting Officer*

C. MARSHALL DANN
*Commissioner of Patents and Trademarks*